United States Patent [19]

Shimizu

[11] Patent Number: 5,004,312

[45] Date of Patent: Apr. 2, 1991

[54] METHOD FOR CONTROLLING A POLARIZATION OF LIGHT

[75] Inventor: Haruhito Shimizu, Tokyo, Japan

[73] Assignee: NEC Corporation, Tokyo, Japan

[21] Appl. No.: 491,908

[22] Filed: Mar. 12, 1990

[30] Foreign Application Priority Data

Mar. 10, 1989 [JP] Japan .................................. 64-58731

[51] Int. Cl.⁵ .............................................. E02F 1/03
[52] U.S. Cl. ................................ 350/96.13; 350/371;
350/388; 350/389; 455/616
[58] Field of Search .................. 350/92.13, 93.14, 371,
350/388, 389, 392; 455/616

[56] References Cited

U.S. PATENT DOCUMENTS

| | | | |
|---|---|---|---|
| 3,645,603 | 2/1972 | Smith | 350/371 |
| 3,822,379 | 7/1984 | Brienza | 350/371 |
| 4,668,052 | 5/1987 | Shirasaki | 350/388 |
| 4,735,490 | 4/1988 | Kuti et al. | 350/388 |
| 4,752,120 | 6/1988 | Shimizu | 350/388 |
| 4,768,851 | 9/1988 | Shaw et al. | 350/371 |
| 4,792,207 | 12/1988 | Shaw et al. | 350/371 |
| 4,856,094 | 8/1989 | Heidrich et al. | 350/96.13 |
| 4,923,290 | 5/1990 | Brinkmeyer et al. | 350/371 |
| 4,943,132 | 7/1990 | Huang | 350/96.13 |

Primary Examiner—Bruce Y. Arnold
Assistant Examiner—Martin Lerner
Attorney, Agent, or Firm—Sughrue, Mion, Zinn, Macpeak & Seas

[57] ABSTRACT

First to fifth birefringences are generated in series along a light propagating medium. The first to fifth birefringences have main axes of 0°, 45°, 0°, 45° and 0° relative to an arbitrary direction orthogonal to a light propagating direction of the medium. The magnitude of the birefringences are changed to change first to fifth phase differences. In an ordinary polarization control, the second to fourth phase differences are changed. However, one or both of the first and fifth phase differences are changed in a resetting operation for one of the second to fourth phase differences. Consequently, the phase differences are reset without the dependency on polarizations of an input light supplied to a polarization controller and an output light supplied from the polarization controller.

3 Claims, 8 Drawing Sheets

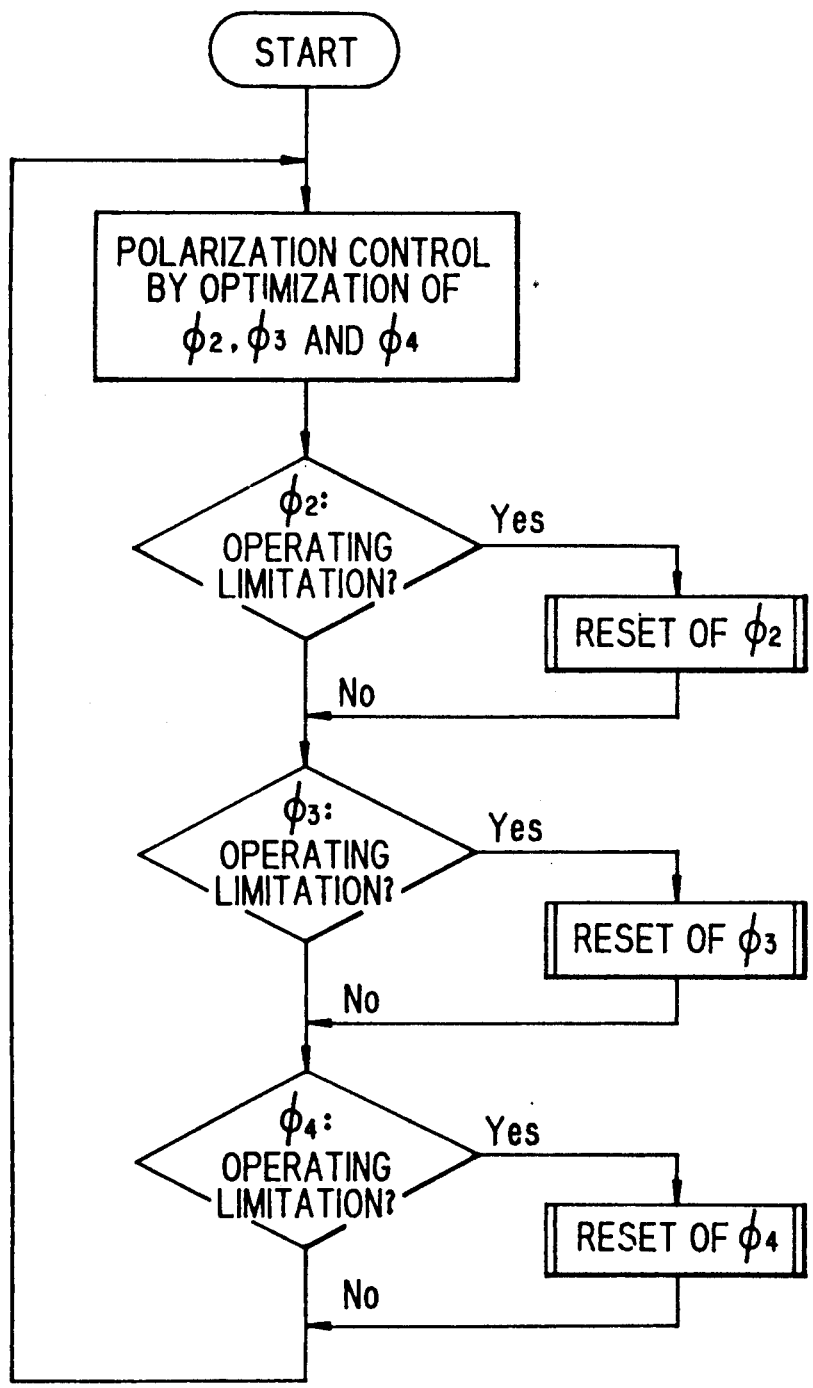

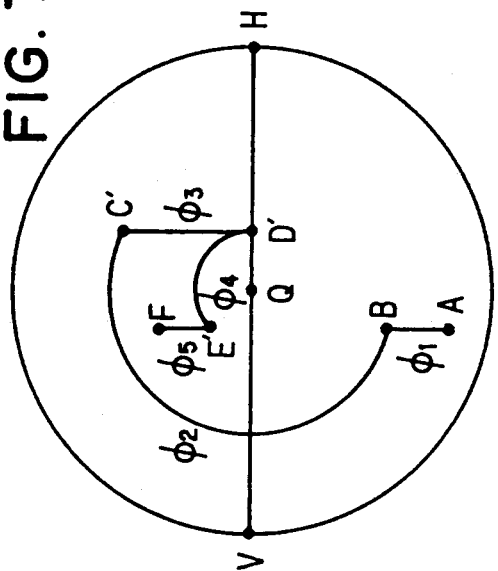
FIG. 7B
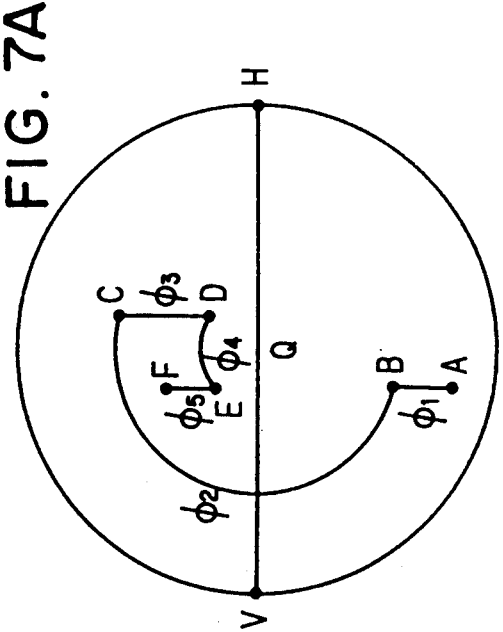
FIG. 7A
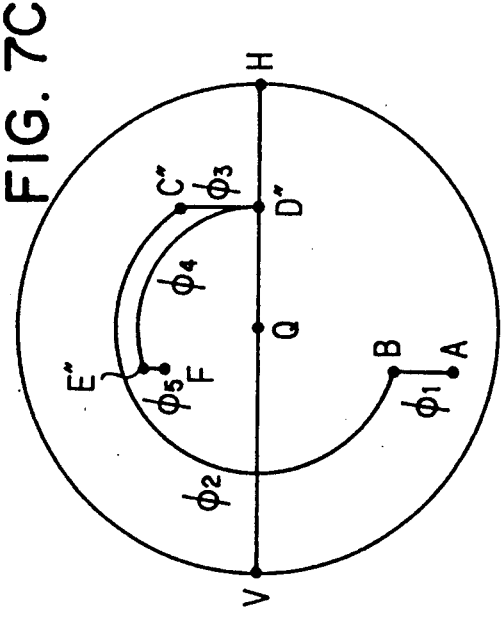
FIG. 7D
FIG. 7C

METHOD FOR CONTROLLING A POLARIZATION OF LIGHT

FIELD OF THE INVENTION

This invention relates to a method for controlling a polarization of light, and more particularly to, a method for controlling a polarization of light which is applied to an optical communication system, an optical fiber sensor, etc.

BACKGROUND OF THE INVENTION

In an optical heterodyne communication system, an optical sensor such as an optical fiber gyro, and the like, a polarization controller which transforms a light having an arbitrary polarization to a light having a constant polarization, or to a light having another arbitrary polarization is necessary to be provided. In an optical heterodyne receiving system using a single mode optical fiber, especially, it is considered that a fluctuation of a polarization such as a rotation of a polarized light angle to the same direction, which is caused in the transmitting of a signal light through the single mode optical fiber, is produced. Therefore, the signal light is required to be transformed to a light having an arbitrary polarization. In this point, an endless polarization controller having no limitation in a polarization controlling operation is required to be developed, to suppress such a fluctuation of a polarization.

A conventional endless polarization controller, in which an arbitrary polarization is transformed to another arbitrary polarization, is described on pages 290 to 292 of "Electronics Letters, 12th March 1987 Vol. 23, No. 6." by N. G. Walker, et al. This conventional endless polarization controller comprises four optical phase modulators which are in series connected to generate birefringences having alternately different directions by 45°, wherein the optical phase modulators operate in limited ranges to control a polarization of light. In operation, where one of the four optical phase modulators reaches a limitation of an operating voltage, it is then reset as the polarization control is continued by the other optical phase modulators. At this reset operation, two optical phase modulators which are next to the reset optical phase modulator on one side thereof are varied in voltage to compensate the fluctuation of an output light polarization due to the voltage resetting. This compensation is possible to be carried out in only a case where a radius of a circular arc defined on the Poincaré sphere in accordance with the variation of a polarization by the reset optical phase modulator is smaller than that of a circular arc defined on the Poincaré sphere in accordance with the variation of a polarization by the optical phase modulator which is farther than the other in the aforementioned next two modulators from the reset optical phase modulator.

It is possible to adjust a largeness and smallness relation between the two circular arcs by changing driving voltages of two optical phase modulators which are positioned on the both sides of the reset optical phase modulator. However, the conventional polarization controller has a disadvantage in that the aforementioned adjustment can not be carried out dependent on polarization states of input and output lights. That is, an optical phase modulator is difficult to be reset without the dependency on polarization states of input and output lights.

Furthermore, even if the resetting operation starts in an allowable condition, there is a possibility in which the condition is no longer met during the resetting period due to the fluctuation of polarizations of the input and output lights. In this case, the resetting operation is required to be interrupted, and, if the resetting operation is continued, an output light of a predetermined polarization is not obtained to result in a power penalty, so that a stable resetting operation is not carried out.

Accordingly, it is an object of this invention to provide a method for controlling a polarization of light in which a resetting of a voltage is stably carried out without the dependency on polarizations of input and output lights.

According to this invention, a method for controlling a polarization of light, comprises steps of:

generating first to fifth birefringences for a propagating light in series having main axes of 0°, 45°, 0°, 45° and 0° relative to an arbitrary direction on a surface orthogonal to a propagating direction of said light;

changing magnitude of said first to fifth birefringences to generate first to fifth phase differences $\phi_1$, $\phi_2$, $\phi_3$, $\phi_4$ and $\phi_5$ corresponding thereto between each of polarizations corresponding to said main axes and each of polarizations orthogonal to said main axes; and controlling said second to fourth phase differences $\phi_2$, $\phi_3$ and $\phi_4$ among said first to fifth phase differences $\phi_1$, $\phi_2$, $\phi_3$, $\phi_4$ and $\phi_5$ to be appropriate values, thereby transforming said propagating light having an arbitrary polarization at an input terminal to said propagating light having another arbitrary polarization at an output terminal;

wherein, in a case where one of said second to fourth phase differences $\phi_2$, $\phi_3$ and $\phi_4$ reaches an operating limitation, one or both of said first and fifth phase differences $\phi_1$ and $\phi_5$ are controlled to be appropriate values along with remaining two phase differences among said second to fourth phase differences $\phi_2$, $\phi_3$ and $\phi_4$, and said one of said second to fourth phase difference $\phi_2$, $\phi_3$ and $\phi_4$ is then restored to be inside an operating range by an arbitrary value, so that said controlling of said second to fourth phase differences $\phi_2$, $\phi_3$ and $\phi_4$ restarts to provide said propagating light having said another arbitrary polarization at said output terminal.

BRIEF DESCRIPTION OF THE DRAWINGS

This invention will be explained in more detail in conjunction with appended drawings, wherein:

FIG. 4 is a flow chart explaining the method for controlling a polarization of light in the preferred embodiment, FIGS. 7A to 7D, and FIGS. 8A to 8D are explanatory diagrams showing the Poincaré spheres on each of which the variation of a polarization is shown dependent on phase differences $\phi_1$, $\phi_2$, $\phi_3$, $\phi_4$ and $\phi_5$.

DESCRIPTION OF THE PREFERRED EMBODIMENTS

Figure 1:
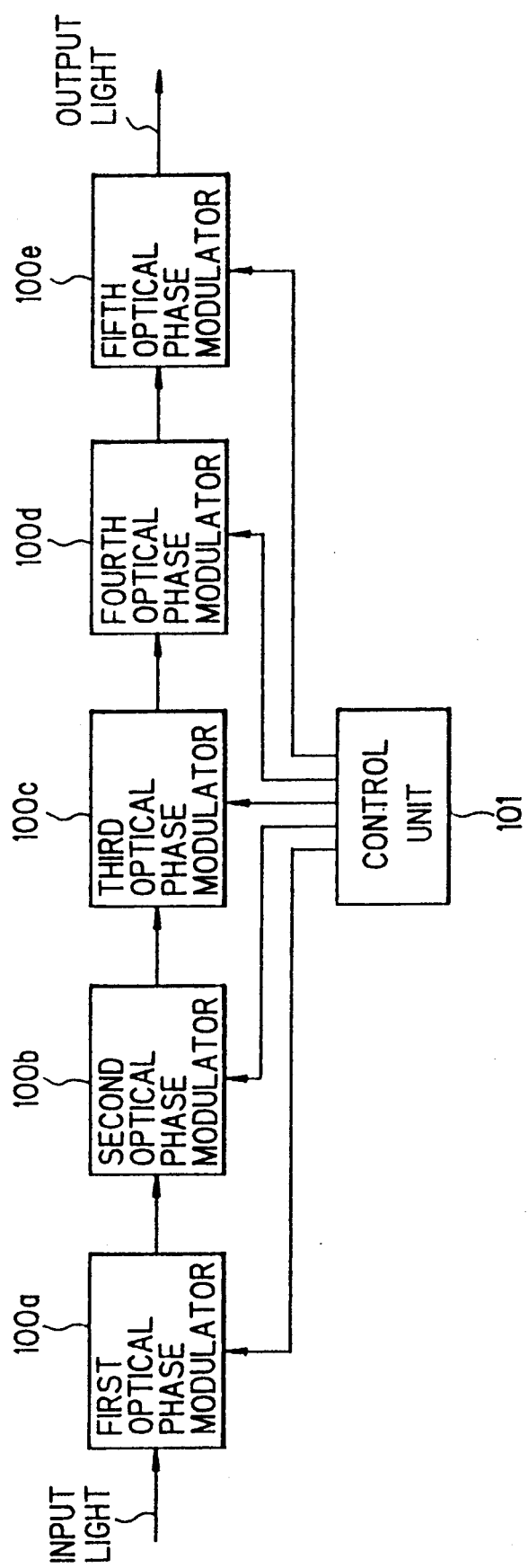
FIG. 1 is a block diagram showing a polarization controller in which a method for controlling a polarization of light in a preferred embodiment according to the invention is carried out.

FIG. 1 shows a polarization controller, in which a method for controlling a polarization of light in the preferred embodiment is carried out. The polarization controller comprises first to fifth optical phase modulators 100a to 100e, and a control unit for controlling the modulators 100a to 100e. In this polarization controller, the first to fifth optical phase modulators 100a to 100e are connected in series one after another, such that effective main axes of birefringences are in directions of 0°, 45°, 0°, 45°, and 0° relative to a horizontal line on a surface orthogonal to a propagating direction of light.

In operation, when an input light is supplied to the first optical phase modulator 100a, the light is propagated through the first to fifth optical phase modulators 100a to 100e, and an output light is supplied from the fifth optical phase modulator 100e. In the first to fifth optical phase modulators 100a to 100e, phase differences $\phi_1$, $\phi_2$, $\phi_3$, $\phi_4$ and $\phi_5$ are generated between polarizations of the main axes of the birefringences and those orthogonal thereto. The first to fifth optical phase modulators 100a to 100e are controlled to provide predetermined birefringences by the control unit 101.

Figure 2:
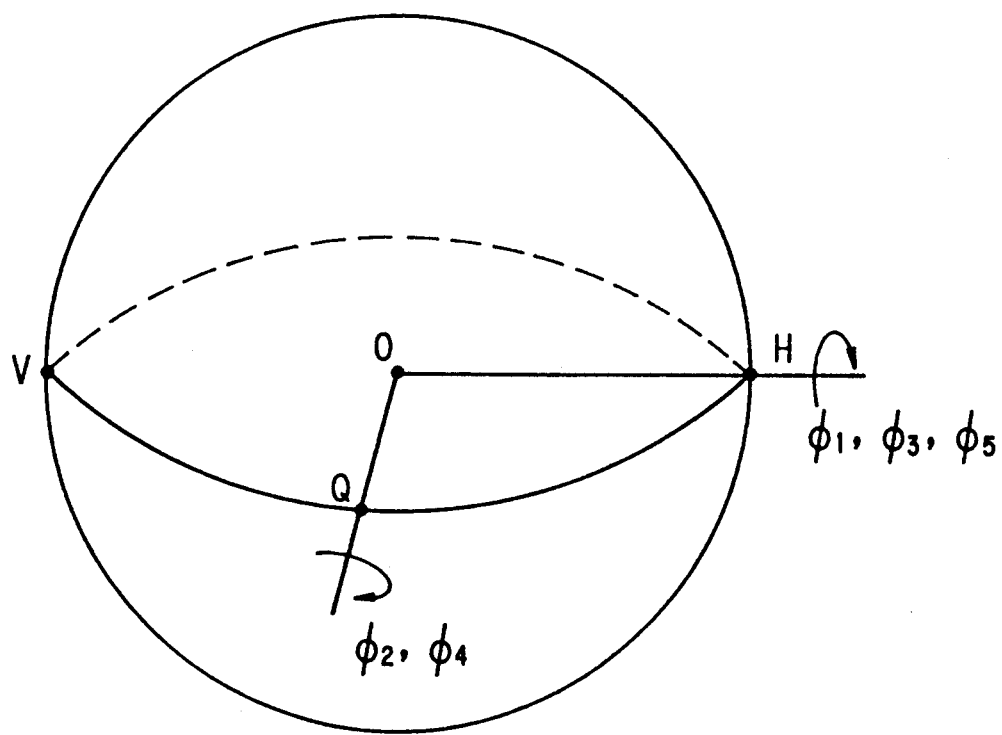
FIG. 2 is an explanatory diagram showing the Poincaré sphere which explains a polarization transformation by an optical phase modulator.

Next, polarization transforming operation of each optical phase modulator will be explained in FIG. 2. The polarization transforming operation of the first, third and fifth optical phase modulators 100a, 100c and 100e are expressed by a rotation around an axis passing through the center O of the sphere and a point H representing a horizontal linear polarization on the equator. On the other hand, the polarization transforming operation of the second and fourth optical phase modulators 100b and 100d, the birefringent main axes of which are different in direction from those of the above three optical phase modulators 100a, 100c and 100e by 45°, are expressed by a rotation around an axis passing through the center O of the sphere and a point Q representing a linear polarization of 45° on the equator. In this regard, rotation angles are proportional to the phase differences $\phi_1$, $\phi_2$, $\phi_3$, $\phi_4$ and $\phi_5$. In the sphere, a point V represents a vertical linear polarization. This Poincaré sphere is described on pages 31 and 32 of "Principles of optics", 6th ed. Pergamon Press, Oxford, 1980 by Max Born et. al.

Figure 3:
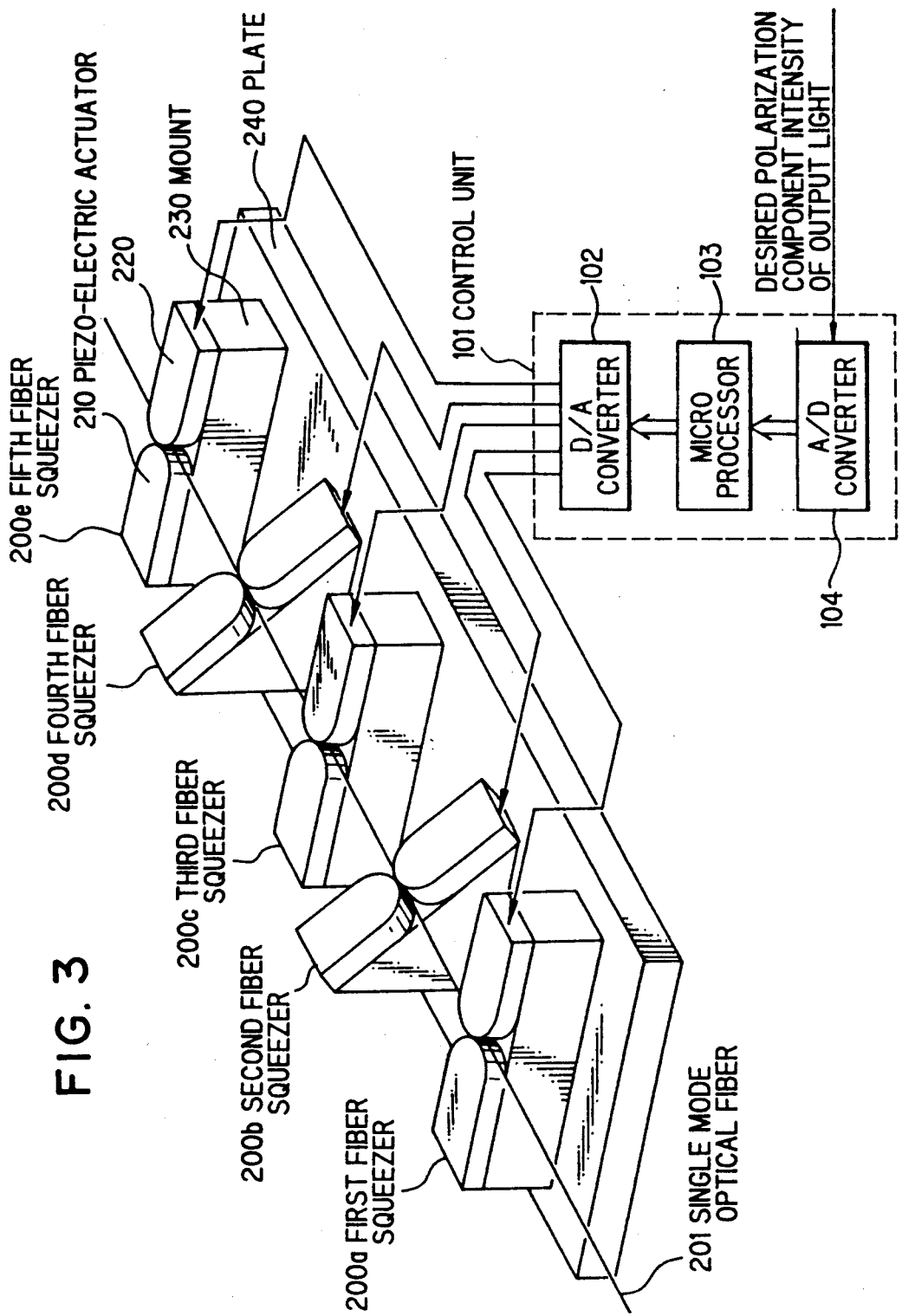
FIG. 3 is a schematic view showing a polarization controller in the preferred embodiment.

FIG. 3 shows a polarization controller based on the method for controlling a polarization of light in the preferred embodiment. The aforementioned first to fifth optical phase modulators 100a to 100e are embodied by first to fifth fiber squeezers 200a to 200e, each comprising a pair of piezo-electric actuators 210 and 220, and a stainless steel mount 230 for fixing the actuators 210 and 220 thereon. The five mounts 230 for the first to fifth fiber squeezers 200a to 200e are provided on a common plate 240. The polarization controller further comprises a single mode optical fiber 201 which receives side pressures from each pair of the piezo-electric actuators 210 and 220 to generate birefringences, and a control unit 101 including an A/D converter 104 for converting an analog signal to a digital signal in regard to a predetermined polarization component intensity for an output light, a microprocessor unit 103 for calculating driving voltages given to the piezo-electric actuators 210 and 220 of the first to fifth fiber squeezers 200a to 200e based on the method for controlling a polarization of light, and a D/A converter 102 for converting a digital signal of the calculated voltages to analog voltage signals. In the first fiber squeezers 200a to 200e, the side pressures applied to the single mode optical fiber 201 are 0°, 45°, 0°, 45° and 0° in directions. The above described polarization controller may be applied to the purpose of a polarization compensation in an optical heterodyne receiver, in which an intensity of an intermediate frequency signal is controlled in a result of controlling an intensity of a predetermined polarization component of an output light.

In operation, the second, third and fourth fiber squeezers 200b, 200c and 200d are controlled to optimize phase differences $\phi_2$, $\phi_3$ and $\phi_4$ thereof by the control unit 101, so that an input light having an arbitrary polarization is propagated through the single mode optical fiber 201 to be converted to an output light having another arbitrary polarization, as shown in FIG. 4. The optimization of the phase differences $\phi_2$, $\phi_3$ and $\phi_4$ is carried out as explained below. Ordinarily, an operation range of each phase difference is 0 to $3\pi$, where a polarization control is performed by changing the phase differences $\phi_2$, $\phi_3$ and $\phi_4$. At first, the second fiber squeezer 200b is controlled to provide a minute change for the phase difference $\phi_2$, so that an intensity of a predetermined polarization is the maximum value. Then, the same procedure is carried out for the phase differences $\phi_3$ and $\phi_4$. Thereafter, this is repeated in an order of the phase differences $\phi_2$, $\phi_3$ and $\phi_4$, so that the phase differences $\phi_2$, $\phi_3$ and $\phi_4$ are gradually made to be optimum values. This operation is described on pages 965 to 969 of "IEEE J. Quantum Electron", 1981, Vol. QE-17 entitled "Electrooptic guided-wave device for General polarization transformations" by R. C. Alferness. When the phase differences $\phi_2$, $\phi_3$ and $\phi_4$ reaches a limitation of $3\pi$ or 0, each phase difference is reset to be $\pi$ or $2\pi$ which is different from the limitation by $2\pi$. This resetting operation is carried out along with a polarization control operation of the other fiber squeezers, so that a power penalty which is caused by the resetting operation does not occur.

Figure 5A:
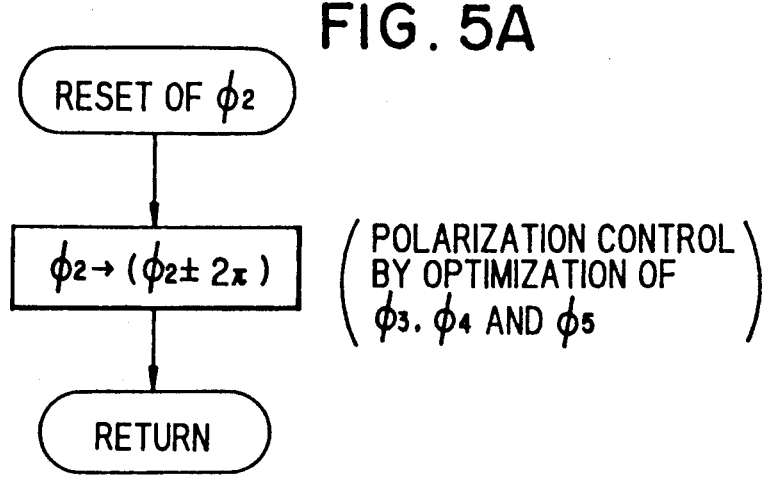
FIGS. 5A, 5B and 5C are flow charts explaining methods for resetting phase differences in the method for controlling a polarization of light in the preferred embodiment.
Figure 5B:
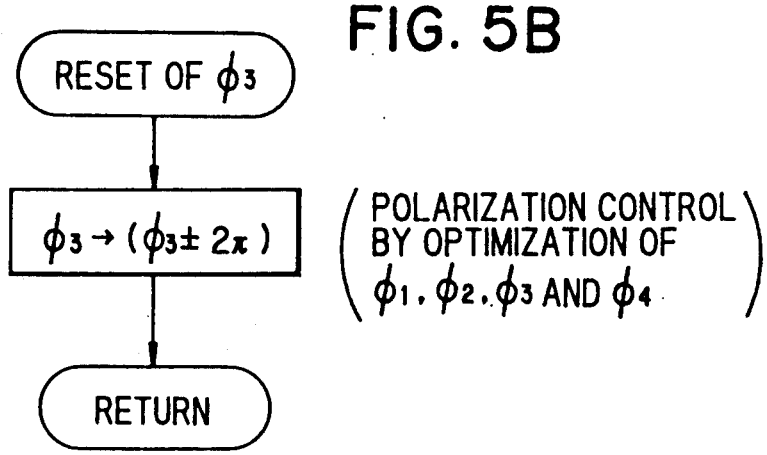
Figure 5C:
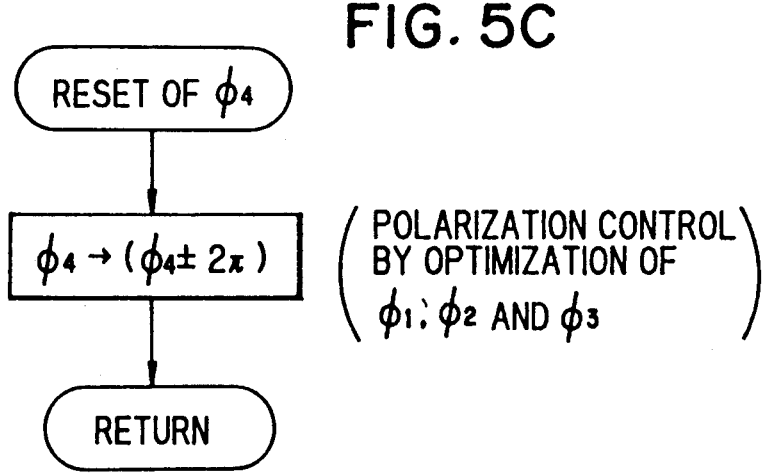

The phase differences $\phi_2$, $\phi_3$ and $\phi_4$ are reset as explained in FIGS. 5A, 5B and 5C. At first, where the phase difference $\phi_2$ is reset, the phase differences $\phi_3$, $\phi_4$ and $\phi_5$ are optimized to compensate the fluctuation of an output light polarization. This optimizing procedure is the same as one explained for the phase differences $\phi_2$, $\phi_3$ and $\phi_4$. This resetting operation can be performed without a power penalty as explained below.

Figure 6:
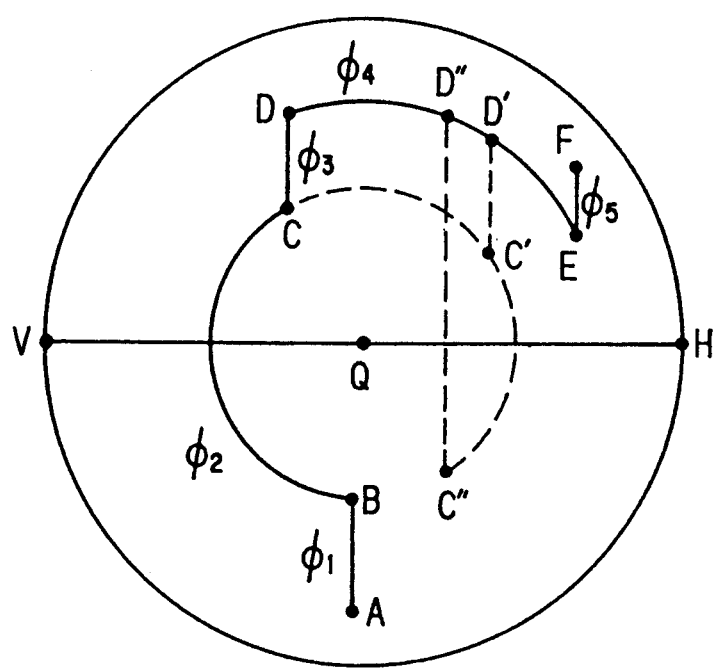
FIG. 6 is an explanatory diagram showing the Poincaré sphere on which the variation of a polarization in each phase difference based on a resetting operation is defined.

FIG. 6 is a side view of the Poincaré sphere for showing the change of a polarization induced by the phase differences $\phi_1$, $\phi_2$, $\phi_3$, $\phi_4$ and $\phi_5$, wherein points A, B, C, D, E and F indicate polarizations along the single mode optical fiber 201, among which a polarization of an input light supplied to the first fiber squeezer 200a is indicated by the point A, and a polarization of an output light supplied from the fifth fiber squeezer 200e is indicated by the point F. Here, it is assumed that a polarization is changed along a line connecting points B, C, D and E between the points A and F. Where the phase difference $\phi_2$ is changed for the resetting operation, the point C indicating a polarization of a light supplied from the second fiber squeezer 200b is shifted to result in the shift of the point F, so that a polarization of an output light supplied from the polarization controller is deviated from a predetermined polarization, thereby resulting in a power penalty, if any compensating measure is adopted. This power penalty is compensated by adjusting the phase differences $\phi_3$ and $\phi_4$. For instance, where the phase difference $\phi_2$ is increased, a polarization route of points A, B, C', D', E and F or points A, B, C", D", E and F is controlled to be defined on the sphere by changing the phase differences $\phi_3$ and $\phi_4$, thereby avoiding the shift of the point F. Thus, a position of the point F is maintained in place. This means that the phase difference $\phi_2$ is reset without a power penalty. Where the phase difference $\phi_2$ is changed with the maintaining in position of the point F by $2\pi$, the phase differences $\phi_3$ and $\phi_4$ are restored to be the original values. In this case, the change of the phase differences $\phi_3$ and $\phi_4$ is from $-\pi$ to $\pi$ at the maximum. Thus, the phase difference $\phi_2$ is reset by $2\pi$ without changing any other phase differences.

As described above, a resetting operation is carried out without a power penalty in a case where a radius of a circular arc defined on the Poincaré sphere by a polarization change based on the phase difference $\phi_2$ is smaller than that of a circular arc defined on the Poincaré sphere by a polarization change based on the phase difference $\phi_4$. This is described in the aforementioned report by N. G. Walker. If this condition is not met, a polarization transformation to a predetermined polarization is impossible to be realized for an output light in the result of a resetting operation, thereby producing a power penalty.

Then, the resetting operation of the phase difference $\phi_2$ which is carried out without meeting the above condition will be discussed in FIGS. 7A, 7B, 7C and 7D, wherein other examples of a polarization change based on the phase differences $\phi_1$, $\phi_2$, $\phi_3$, $\phi_4$ and $\phi_5$ are shown.

FIG. 7A shows a polarization state at a time when a resetting operation of the phase difference $\phi_2$ starts, where a radius of a circular arc defined on the Poincaré sphere by a polarization change based on the phase difference $\phi_2$ is larger than that of a circular arc defined on the Poincaré sphere by a polarization change based on the phase difference $\phi_4$. When the change of the phase difference $\phi_2$ starts for a resetting operation, the phase differences $\phi_3$ and $\phi_4$ are changed to avoid a power penalty. In the conventional polarization controller, there is a limitation in which a point D' indicating a polarization of an output light based on the phase difference $\phi_3$ can not exceed the equator in compensating a fluctuation of an output light polarization based on the phase differences $\phi_3$ and $\phi_4$. On the other hand, the phase difference $\phi_5$ can be changed in the invention, and, in this state, where the phase difference $\phi_2$ is changed, the phase difference $\phi_5$ is also changed to compensate a fluctuation of an output light polarization, as shown in FIGS. 7C and 7D. As shown in FIG. 7D, a radius of a circular arc defined on the Poincaré sphere by a polarization change based on the phase difference $\phi_2$ is smaller than that defined thereon by a polarization change based on the phase difference $\phi_4$, so that there is provided a state in which a polarization change is compensated only by the phase differences $\phi_3$ and $\phi_4$. As explained above, even if the radius on the Poincaré sphere in accordance with the phase difference $\phi_2$ is larger than the radius on the Poincaré sphere in accordance with the phase difference $\phi_4$ at the starting time of the resetting operation for the phase difference $\phi_2$, the position of the point F is maintained to be fixed, so that the phase difference $\phi_2$ is reset to provide no power penalty. The phase difference $\phi_2$ is only reset by $2\pi$, and the phase difference $\phi_5$ is then restored to be a value prior to the starting of the resetting operation, so that the phase differences $\phi_3$ and $\phi_4$ are restored to be original values.

As described above, the phase difference $\phi_2$ is reset to result in no power penalty without the dependency of polarizations of an input light supplied to the polarization controller and an output light supplied therefrom. Furthermore, even if the polarizations of the input and output lights are changed during a period of the resetting operation, the phase differences $\phi_3$, $\phi_4$ and $\phi_5$ are correspondingly changed, so that the resetting operation having no power penalty is carried out.

The phase difference $\phi_3$ is reset in a similar procedure as in the resetting of the phase difference $\phi_2$, thereby providing no power penalty. In the resetting of the phase difference $\phi_3$, a polarization is controlled in accordance with the phase differences $\phi_1$, $\phi_2$, $\phi_4$ and $\phi_5$ simultaneously. Where a radius of a circular arc defined on the Poincaré sphere by a polarization changed based on the phase difference $\phi_3$ is smaller than a radius of a circular arc defined on the Poincaré sphere by a polarization change based on the phase difference $\phi_1$ or $\phi_5$, the phase difference $\phi_3$ is reset, while compensating a fluctuation of an output light polarization in accordance with the phase differences $\phi_1$ and $\phi_2$, or the phase differences $\phi_4$ and $\phi_5$.

On the other hand, where a radius of a circular arc defined on the Poincaré sphere by a polarization change based on the phase difference $\phi_3$ is larger than that defined on the Poincaré sphere by a polarization change based on the phase difference $\phi_1$ or $\phi_5$, the phase difference $\phi_3$ is reset as explained in FIGS. 8A, 8B, 8C and 8D, wherein polarization changes induced by the phase differences $\phi_1$, $\phi_2$, $\phi_3$, $\phi_4$ and $\phi_5$ are shown.

Figure 8B:
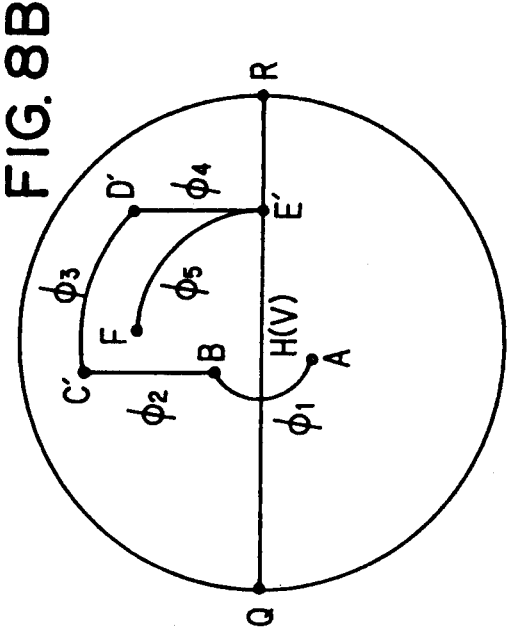
Figure 8D:
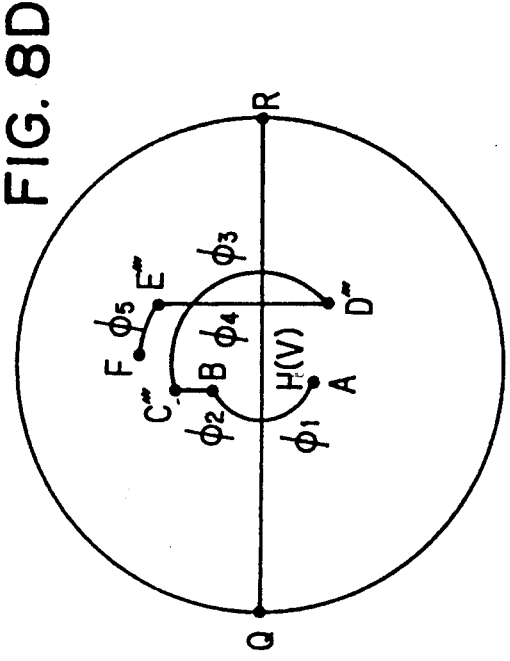
Figure 8A:
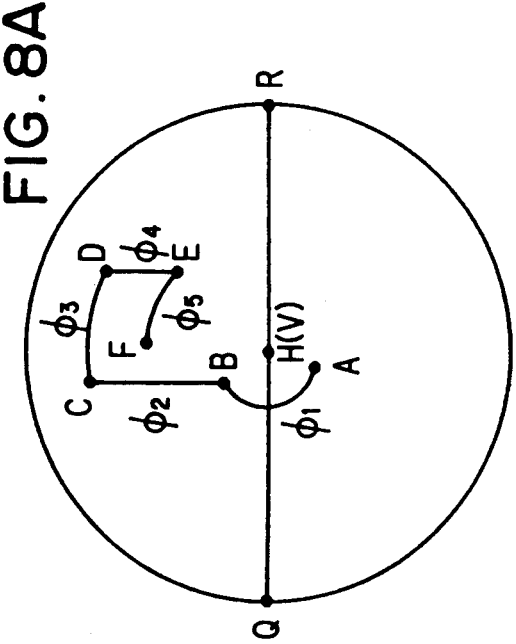
Figure 8C:
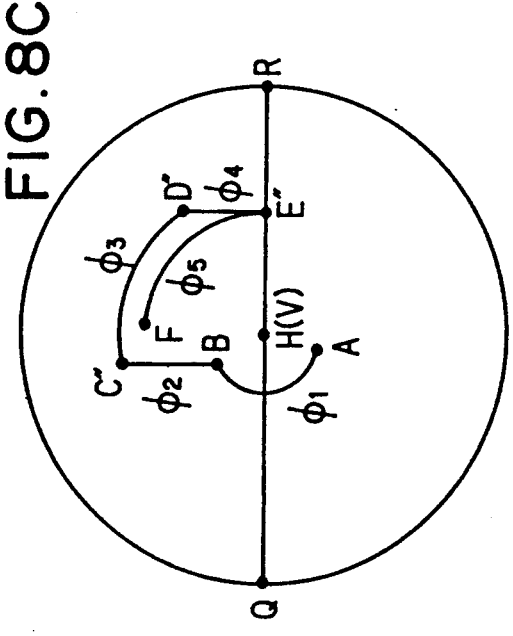

FIG. 8A shows a polarization state at the starting time of the resetting operation for the phase difference $\phi_3$. At this time, a radius of a circular arc defined on the Poincaré sphere by a polarization change based on the phase difference $\phi_3$ is larger than that defined on the Poincaré sphere by a polarization change based on the phase difference $\phi_1$ or $\phi_5$. When the phase difference $\phi_3$ is changed for the resetting operation, the phase differences $\phi_1$ and $\phi_2$, the phase differences $\phi_4$ and $\phi_5$, or the both thereof are changed to result in no power penalty. For the simplification of explanation, it is assumed that the phase differences $\phi_4$ and $\phi_5$ are firstly changed in this preferred embodiment. However, such a compensation for polarization fluctuation by phase differences $\phi_4$ and $\phi_5$ is carried out to such an extent that an output light polarization based on the phase difference $\phi_4$ indicated by a point E' reaches only just on the equator, as shown in FIG. 8B. In this state, when the phase difference $\phi_3$ is changed, the phase difference $\phi_2$ is also changed to compensate a fluctuation of an output light polarization, as shown in FIG. 8C, and then in FIG. 8D. As a result, a radius of a circular arc defined on the Poincaré sphere by a polarization change based on the phase difference $\phi_3$ is smaller than that defined on the Poincaré sphere by a polarization change based on the phase difference $\phi_5$, so that there is provided a state in which a polarization fluctuation is compensated only by the phase differences $\phi_4$ and $\phi_5$. As apparent from the above explanation, the position of the point F is maintained to be fixed in accordance with the procedure as shown in FIGS. 8A to 8D. This means that the phase difference $\phi_3$ is reset without a power penalty.

Furthermore, where a radius of a circular arc defined on the Poincaré sphere by a polarization change based on the phase difference $\phi_3$ becomes smaller than that defined on the Poincaré sphere by a polarization change based on the phase difference $\phi_1$ due to the change of the phase difference $\phi_4$, a polarization change can be compensated only by the phase differences $\phi_1$ and $\phi_2$. The phase difference $\phi_3$ is only reset by $2\pi$, and the phase difference $\phi_2$ or $\phi_4$ is then restored to be a value prior to the starting of the resetting operation. Thus, the phase differences $\phi_4$ and $\phi_5$, or the phase differences $\phi_1$ and $\phi_2$ are restored to be original values.

As described above, the phase difference $\phi_3$ is reset without a power penalty by adjusting the phase differences $\phi_1$, $\phi_2$, $\phi_4$ and $\phi_5$, without the dependency of polarizations of an input light supplied to the polarization controller and an output light supplied therefrom. Furthermore, even if the input and output light polarizations are changed during a period of the resetting operation, the phase difference $\phi_3$ is continued to be reset without a power penalty in accordance with the corresponding change of the phase differences $\phi_1$, $\phi_2$, $\phi_4$ and $\phi_5$.

The phase difference $\phi_4$ is reset in the same manner as the resetting of the phase difference $\phi_2$. That is, the expressions of the phase differences $\phi_1$, $\phi_2$, $\phi_3$, $\phi_4$ and $\phi_5$ as used in the explanation for the resetting of the phase difference $\phi_2$ are, respectively, replaced in the resetting of the phase difference $\phi_4$ by those of the phase differences $\phi_5$, $\phi_4$, $\phi_3$, $\phi_2$ and $\phi_1$.

The change of a phase difference which is caused by compensating a polarization change resulted from the resetting of another phase difference is from at the maximum for the phase differences $\phi_1$ and $\phi_5$, and is from $-\pi$ to $\pi$ at the maximum for the phase differences $\phi_2$, $\phi_3$ and $\phi_4$. Accordingly, an operating range is for the phase differences $\phi_1$ and $\phi_5$, and $5\pi$ which is obtained by adding $2\pi$ of the resetting time to $3\pi$ of an ordinary polarization controlling time for the phase differences $\phi_2$, $\phi_3$ and $\phi_4$. In this manner, the control of a polarization is possible to be carried out in a limited operating range for each phase difference.

As understood from the above explanation, operation of the invention will be summarized below.

In the ordinary state, the three phase differences $\phi_2$, $\phi_3$ and $\phi_4$ are changed to control a polarization of light. In a resetting state, however, the two phase differences $\phi_1$ and $\phi_5$ are changed in addition to the phase differences $\phi_2$, $\phi_3$ and $\phi_4$. Polarizations of an input light supplied to the second to fourth optical phase modulators and an output light supplied therefrom are changed by the phase differences $\phi_1$ and $\phi_5$, so that two circular arcs defined on the Poincaré sphere by polarization changes based on two phase differences relating to the resetting operation can be controlled to be larger and smaller than the other without the dependency on polarization states of an input light supplied to an optical polarization controller and an output light supplied therefrom. Consequently, a phase difference is reset in the condition that a power penalty does not occur. Furthermore, even if the polarizations of the input and output lights of the polarization controller are changed during a period of the resetting operation, the condition that a power penalty does not occur is maintained. That is, a stable resetting operation can be carried out for a phase difference without the dependency on the polarizations of the input light supplied to the polarization controller and the output light supplied from the polarization controller.

In the preferred embodiment, a fiber squeezer utilizing a piezo-electric actuator may be replaced by one utilizing an electric magnet, and the fiber squeezer may be replaced by an optical phase modulator of a bulk type or a waveguide type utilizing an electrooptic effect.

Furthermore, although an ordinary operating range of the phase differences $\phi_2$, $\phi_3$ and $\phi_4$ is explained to be $3\pi$, it may be any phase difference more than $2\pi$, and, although a resetting angle is explained to be $2\pi$ for the phase differences $\phi_2$, $\phi_3$ and $\phi_4$, it may be an arbitrary angle, provided that a changing angle remains in other phase differences at the finishing time of the resetting operation. If the resetting angle is $2n\pi$ ($n = 1, 2, 3 \ldots$), the other phase differences remain unchanged before and after the resetting operation, so that the resetting of the phase differences can be effectively carried out.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method for controlling a polarization of light, comprising steps of:

generating first to fifth birefringences for a propagating light in series having main axes of 0°, 45°, 0°, 45° and 0° relative to an arbitrary direction on a surface orthogonal to a propagating direction of said light;

changing magnitude of said first to fifth birefringences to generate first to fifth phase differences $\phi_1$, $\phi_2$, $\phi_3$, $\phi_4$ and $\phi_5$ corresponding thereto between each of polarizations corresponding to said main axes and each of polarizations orthogonal to said main axes; and controlling said second to fourth phase differences $\phi_2$, $\phi_3$ and $\phi_4$ among said first to fifth phase differences $\phi_1$, $\phi_2$, $\phi_3$, $\phi_4$ and $\phi_5$ to be appropriate values, thereby transforming said propagating light having an arbitrary polarization at an input terminal to said propagating light having another arbitrary polarization at an output terminal;

wherein, in a case where one of said second to fourth phase differences $\phi_2$, $\phi_3$ and $\phi_4$ reaches an operating limitation, one or both of said first and fifth phase differences $\phi_1$ and $\phi_5$ are controlled to be appropriate values along with remaining two phase differences among said second to fourth phase differences $\phi_2$, $\phi_3$ and $\phi_4$, and said one of said second to fourth phase difference $\phi_2$, $\phi_3$ and $\phi_4$ is then restored to be inside an operating range by an arbitrary value, so that said controlling of said second to fourth phase differences $\phi_2$, $\phi_3$ and $\phi_4$ restarts to provide said propagating light having said another arbitrary polarization at said output terminal.

2. A method for controlling a polarization of light, according to claim 1, wherein:

in a case where said phase difference $\phi_2$ reaches said operating limitation, said phase differences $\phi_3$, $\phi_4$ and $\phi_5$ are controlled, and said phase difference $\phi_2$ is then restored to be inside said operating range;

in a case where said phase difference $\phi_3$ reaches said operating limitation, said phase differences $\phi_1$, $\phi_2$, $\phi_4$ and $\phi_5$ are controlled, and said phase difference $\phi_3$ is then restored to be inside said operating range; and in a case where said phase difference $\phi_4$ reaches said operating limitation, said phase differences $\phi_1$, $\phi_2$ and $\phi_3$ are controlled, and said phase difference $\phi_4$ is then restored to be inside said operating range.

3. A method for controlling a polarization of light, according to claim 1, wherein:
said first to fifth birefringences are generated by first to fifth optical phase modulators provided in series along a single mode optical waveguide for propagating said propagating light.

* * * * *

UNITED STATES PATENT AND TRADEMARK OFFICE
CERTIFICATE OF CORRECTION

PATENT NO. : 5,004,312

DATED : April 2, 1991

INVENTOR(S) : Haruhito SHIMIZU

It is certified that error appears in the above-identified patent and that said Letters Patent is hereby corrected as shown below:

Col. 7, line 33, after "from" insert $-- -\frac{\pi}{2}$ to $\frac{\pi}{2} --$

Signed and Sealed this

Twenty-fifth Day of August, 1992

*Attest:*

DOUGLAS B. COMER

*Attesting Officer*     *Acting Commissioner of Patents and Trademarks*